Aug. 8, 1972 P. U. DE PAOLIS 3,682,646
PROCESS FOR THE MANUFACTURE OF SOY PROTEIN ISOLATES, SOY PROTEIN CONCENTRATES AND SOY BYPRODUCTS
Filed March 24, 1971
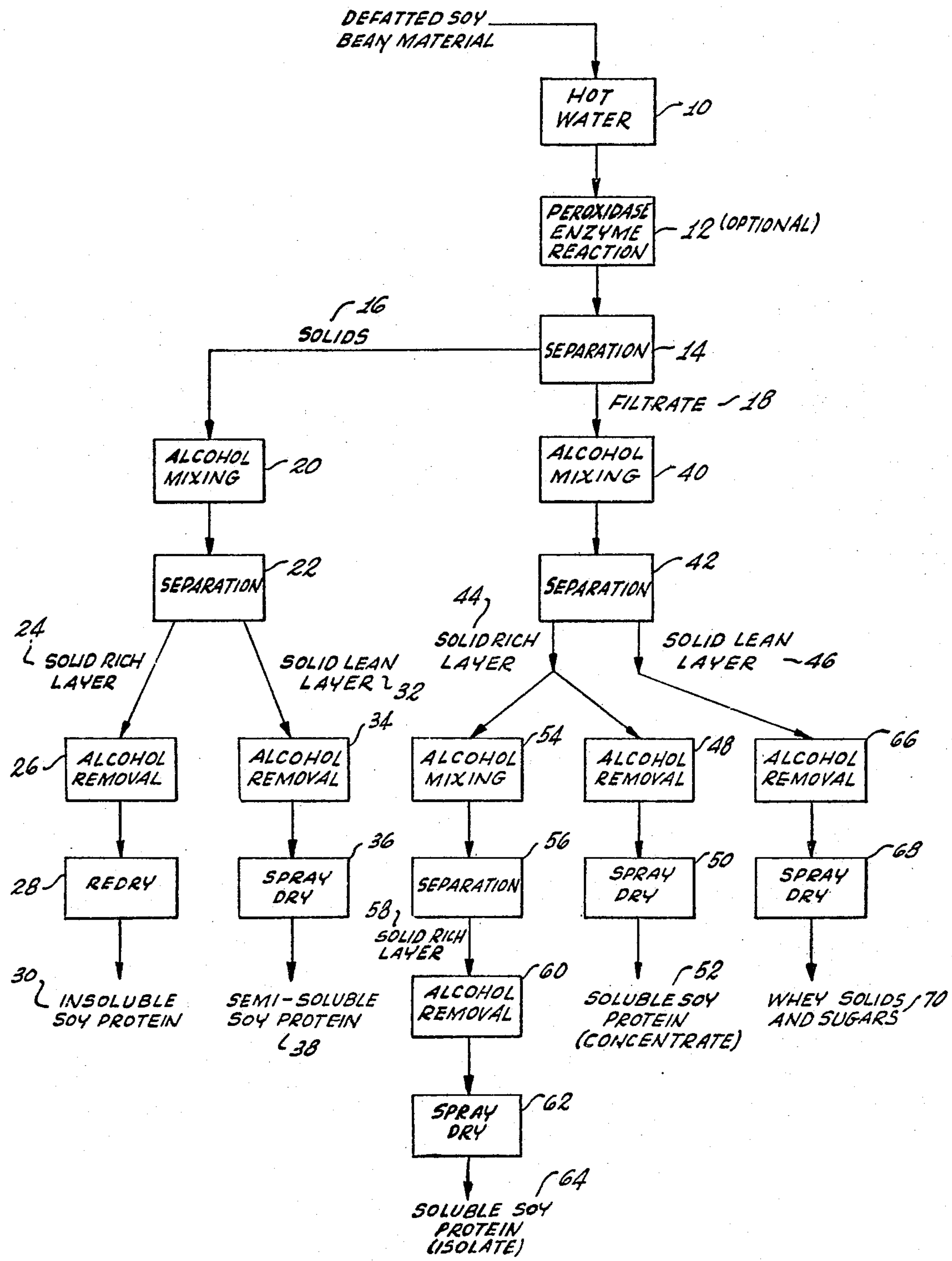

United States Patent Office 3,682,646

Patented Aug. 8, 1972

3,682,646

PROCESS FOR THE MANUFACTURE OF SOY PROTEIN ISOLATES, SOY PROTEIN CONCENTRATES AND SOY BYPRODUCTS

Potito U. de Paolis, Beverly Hills, Calif., assignor to Hunt-Wesson Foods, Inc., Fullerton, Calif.

Continuation-in-part of applications Ser. No. 848,516, Aug. 8, 1969, and Ser. No. 89,829, Nov. 16, 1970. This application Mar. 24, 1971, Ser. No. 127,563

Int. Cl. A23j *1/14*

U.S. Cl. 99—17 10 Claims

ABSTRACT OF THE DISCLOSURE

A process for forming soy protein concentrates and soy protein isolates having high solubility in water and related soy products is disclosed. The process involves mixing defatted, dehulled soybean material in the form of flakes or meal in water at a temperature of between about 175° F. and 212° F. (to destroy the trypsin inhibitors, urease, etc.) and maintaining a pH of preferably between 6.8 and 9 throughout the processing. The aqueous soybean mixture is cooled to a temperature between 100° F. and 140° F. Peroxidase enzymes may be added to the aqueous soybean mixture to decompose peroxides contained therein or antioxidants may be added. The insoluble materials are then separated, from the water soluble soybean solution, and mixed with an alcohol-water solution, such as 70 percent methanol, to yield (1) insoluble soy protein and (2) semisoluble soy protein. The water soluble portion of the aqueous soybean mixture is mixed with an alcohol-water solution, such as 70 percent methanol to yield (1) soy protein concentrates and/or (2) soy protein isolates and (3) soy whey solids and sugars.

CROSS-REFERENCE TO RELATED APPLICATIONS

This application is a continuation-in-part of pending patent applications Ser. No. 848,516, now abandoned, and Ser. No. 89,829 filed on Aug. 8, 1969 and Nov. 16, 1970, respectively, both applications being entitled "Process of Treating Soy Bean Protein With Catalase in the Production of Soy Concentrates, Soy Isolates and Soy Albumen Materials" and "Process for Manufacture of Soy Concentrates, Soy Isolates and Related Products," respectively. The inventor in both applications is Potito U. de Paolis.

BACKGROUND OF THE INVENTION

(1) Field of the invention

This invention relates to soybean and more particularly to soy protein concentrates, soy protein isolates and related soy products.

(2) Description of prior art

Soy protein, mainly soy concentrate and soy isolate, is sold on the market in great abundance today. Soy concentrate is normally defined as the product prepared from high-quality sound, clean, dehulled soybeans by removing most of the oil and water soluble nonprotein constitutents and containing not less than 70 percent protein (Nx 6.25) on a moisture-free basis. (Nx 6.25) is a standard measurement of protein content, N being the percentage of nitrogen in the soybean. Soy isolate is a product prepared from defatted, dehulled soybeans containing not less than 90 percent protein (Nx 6.25) on a moisture-free basis. Patents and publications describing processes for production of soybean products are very numerous. However, most of the products obtained by the prior art processes have certain significant disadvantages. One of the most prevalent disadvantages of soy protein concentrate and soy protein isolate is the lack of water solubility.

In some processes, solubility of the soybean protein is improved by partial enzymatic or hydrolytic depolymerization. However, such processes are difficult to control and, additionally, desirable properties exhibited only by the undergraded molecule are simultaneously destroyed. Other patents claim debittering and deflavoring by stream treatment of the soy meal at a low or neutral pH, by washing of the curd at the isoelectric point, by treatment with chemical reagents, such as $H_2O_2$ or $SO_2$, by solvent extraction and so forth. These treatments, however, denature and thus insolubilize the protein to considerable extent; and, although some of the procedures are effective in removing the beany flavor, the resulting products retain their bitterness and beaniness or astringency.

In some processes alcohol has been added specifically to soybean flakes or meal to remove bitter and anti-wetting constituents without reducing the NSI (the Nitrogen Solubility Index) valve below 68. The Nitrogen Solubility Index is defined as the ratio of soluble nitrogen to total nitrogen multiplied by one hundred (100). The patent to Mustakas, No. 3,023,107, teaches the use of either 95 percent alcohol or 91 percent isopropanol to obtain a debittered soybean material. This patent states that increasing the water content in an alcohol treatment of defatted soybean greatly increases the extent of denaturization produced. Denaturization, as is well known, lowers the NSI value. Mustakas et al., with his alcohol treatment, obtained a product having an NSI value of about 68.

Another process described in U.S. Pat. No. 3,268,503 to Mustakas et al. describes a method of preparing essentially denatured edible soybean protein by treating soybean flakes with a 50 to 70 percent aqueous solution of an alcohol. The product obtained in this patent was essentially denatured and substantially water insoluble and had a NSI value of 4.1.

Leviton et al. in "Industrial and Engineering Chemistry," vol. 30, No. 11, pp. 1305–1311, describes a process for the separation of lactose and soluble proteins of whey by alcohol extraction. The spray dried whey powder contains 69 percent lactose and 12.6 percent protein and was limited to the preparation of a powder containing not more than 50 percent protein.

SUMMARY OF THE INVENTION

It is a primary object of this invention to provide an improved method of producing soy protein concentrate and soy protein isolate.

It is another object of this invention to provide a method of producing soy protein concentrate and soy protein isolate having a high solubility in water.

It is still another object of this invention to provide a method of producing soy protein concentrate and soy protein isolate having high solubility as well as acceptable flavor characteristics.

It is yet another object of this invention to provide a method of producing soy whey solids, insoluble soy protein, semisoluble soy protein as well as soluble soy protein concentrate and/or soluble soy protein isolate.

These and other objects are accomplished by a method in which the defatted, dehulled soybean material initially in the form of meal or flakes, is mixed with water having a temperature of about 175° to 212° F. and a pH of preferably between 6.5 to 7.5 for a short period of time to destroy the trypsin inhibitors, urease, lipoxidase, etc. to thereby remove the primary cause of bad flavors.

The aqueous soybean mixture is then cooled to a temperature between about 100° to 140° F. A sufficient quantity of a peroxidase enzyme, e.g., catalase, is preferably, but not mandatorily, mixed with the aqueous soybean mixture while it is at a temperature of between 100° F. to 140° F. to provide about 100 to 2,000 Baker units of the enzyme catalase for each 100 grams of the starting soybean material. A Baker unit by definition decomposes 264 mg. of hydrogen peroxide under assay conditions. The peroxidase enzyme inhibits the denaturation of the protein in the soybean and increases the solubility and/or dispersibility of the protein as is reported in detail in the parent applications, Ser. No. 848,516 and Ser. No. 89,829 identified herein previously. Alternatively, food antioxidants may be added to the hot water and soy flakes with similar results, about 0.02 percent by weight, of the weight of the flakes being employed. The peroxidase enzymes are preferred, however.

The insoluble soybean solids are then separated, from the filtrate, i.e., the aqueous soybean solution, and mixed with an alcohol solution comprising preferably 70–90 percent methanol, to yield (a) an insoluble soy protein and (b) semisoluble (52% soluble) soy protein.

The filtrate is also mixed with an alcohol solution, preferably 70–90 percent methanol, to yield (c) soy protein concentrate and/or (d) soy protein isolate, both having very high solubilities in water, as well as yielding (e) soy whey solids.

It is possible to process the meal or flakes, by going directly from the hot water (near boiling) step to the separation of the soluble protein fraction from the insolubles step, i.e., without an enzyme or antioxidant addition. However, in this step, less isolate and more concentrate will be produced.

It appears that the treatment of the filtrate material, by means of the alcohol solution of specified concentration ranges, in combination with the prior boiling step and peroxidase enzyme treatment or antioxidant addition, and maintenance of near neutral pH conditions, results in the recovery soy protein concentrate and/or isolate materials of exceedingly high solubilities. This is due to the lack of impairment of the water solubility of the proteinaceous materials at all points in the processing sequence as well as during its separation from polysaccharides and other sugars.

It also appears that the treatment of the soybean solids material in combination with the boiling step, near neutral pH, and the peroxidase enzyme treatment or antioxidant addition followed by the alcoholic solution in specified concentration ranges, results in the recovery of additional soy protein of semisoluble character, e.g., about 52% solubility, as well as the recovery of some insoluble soy protein. The semisoluble protein material, which in itself have novel characteristics, appear to be of low molecular weight (60,000 to 50,000) and is extractable by centrifugation from the insoluble material. The semi-soluble protein apparently is carried down with the insolubles in the initial separation of the soluble protein fraction from the insoluble. These additional recoveries aid in making this process economically attractive.

Other objects and advantages of this invention will be obvious from the following more detailed description of the invention.

BRIEF DESCRIPTION OF THE DRAWINGS

The drawing is a schematic representation of a method in accordance with this invention for producing soy protein products from dehulled soybean material.

DETAILED DESCRIPTION OF AN ILLUSTRATIVE EMBODIMENT

Defatted, dehulled soybean flakes or meal is the preferred starting material for the process in forming any of the soy protein products in accordance with this invention. The soybean materials are dehulled and defatted by conventional methods and results in a material normally having between about 40 to 50 percent protein, 30 to 35 percent carbohydrates, 0.5 to 4 percent fats, 5 to 15 percent ash and fiber nad the remainder moisture. Defatting of the soybeans is normally accomplished by extraction with hexane. Residual fat is commonly less than 1 percent.

Also, it would be understood that if the dehulled soybean flakes or meal are not defatted, there will be present an additional 16 to 20 percent fat content in the starting soybean material. The process will first be described with reference to a starting material of defatted and dehulled soybean flakes.

The starting defatted and dehulled soybeam material for making soy protein products is immersed and mixed in boiling or near boiling water at a temperature of between about 175° F. and about 212° F. for fifteen to thirty-five minutes as shown in step 10 of the drawings. A temperature of 185° F. and a time period of twenty minutes are employed in a preferred embodiment. The preferred ratio of water to defatted soybean material is nine parts water to one part soybean material. The ratio may be varied to some extent.

The pH of the aqueous soybean mixture is held between about 6.5 and 9.0. Preferably the pH is held close to 7 rather than its unbuffered or normal pH of about 6.6. A pH of about 7 is maintained with a buffer, e.g., sodium hydroxide. By maintaining a pH of about 7.0 and as high as 9 at this stage of processing and throughout the process, a substantial increase in the yield results since the solubility of soy protein in aqueous solution is more than 50 percent with a pH of 7.0 in contrast to the solubility of about 38 percent when the water solution is held at a pH of 6.6.

By mixing the soybean material in water at the temperature disclosed above, the trypsin inhibitor in the soybean material is destroyed while very little denaturization of the soy protein occurs. Further, other off-flavor potentiating materials are, to a great extent, destroyed.

The aqueous soybean mixture formed in step 10 is cooled to a temperature between about 100° to 140° F. At this temperature, in an optional step which is used in a preferred embodiment, a peroxidase enzyme, for example catalase, is introduced into and mixed with the aqueous soybean mixture. About 0.1 ml. to 2 ml. of a solution of the enzyme catalase (each milliliter of solution contains 1,000 Baker units of the enzyme catalase) are added per 100 grams of starting defatted, dehulled soybean material. This amounts to about 100 to 2,000 Baker units of the enzyme catalase. A Baker unit decomposes 264 mg. of hydrogen peroxide under assay conditions.

While catalase is the preferred peroxidase enzyme, other enzymes can be used. Examples of other enzymes are: catechol oxidase, p-diphenol oxidase, ascorbate oxidase, NAD peroxidase, NADP peroxidase, fatty acid peroxidase, cytochrome peroxidase, glutathione peroxidase, peroxidase and iodinase.

It is believed that some hydrogen peroxide is produced during the boiling phase of the process. In order to minimize the denaturing and insolubilizing effect of the peroxide on the protein constituents, catalase is introduced at a temperature below 150° F. If the catalase is introduced when the temperature is above 150° F., the catalase will be ineffective. The optimum range of the mixture temperature for the introduction of catalase lies between about 120° F. to 140° F., with the preferred temperature being between 130° and 135° F. The reaction is allowed to proceed for a period of time of between one to fifty minutes for step 12 (preferred twenty minutes). The catalase may be derived from animal, plant, bacteria or fungal sources. It is presently preferred to use catalase derived from a plant source. Fermacolase® a concentrated red-amber aqueous preparation of the enzyme catalase, standardized at 1,000 Baker units of catalase per milliliter is an example of the catalase employed.

The peroxide enzyme reaction step 12 is an optional step, although it is used in the preferred embodiment. If the optional step 12 is not used, an alternate means to accomplish similar results lies in the use of a food grade antioxidant such as butylated hydroxy-anisole (BHA) or butylated hydroxy-toluene (BHT), propyl gallate, mixtures thereof, as well as other well-known food antioxidants such as ascorbic acid. Such antioxidants are heat-stable and therefore may be added to the boiling or near boiling water, step 10. About 0.02 percent by weight of the weight of the soy meal or flakes are added.

After the peroxidase enzyme reaction, step 12, has been completed, or the alternate means just set forth has been accomplished, the reaction mixture is subjected to a separation step 14 in which the solids material (containing some water) are separated from the filtrate 18. A centrifuge or a filter may be employed. In a preferred embodiment, a rotary vacuum filter is used.

The solids material is then mixed with an alcohol-water solution as shown in step 20. The preferred alcohol is methyl alcohol and the preferred alcohol-water solution contains about 70 percent methanol and 30 percent water. The concentration of the alcohol in the alcohol-water solution is 50 to 100 percent of weight with the preferred range being 70 to 90 percent by weight. Other alcohols such as ethanol, isopropanol, and butanol and the like may be used. The quantity of the methanol solution used may vary between one and three times the weight of the solids 16 (including the weight of the water mixed therewith) entering alcohol mixing tank 20, but about 2.3 times of 70 percent MeOH to the weight of the solids material is preferred.

After mixing the solids 16 with the alcohol solution for a period of between one to sixty minutes and preferably of from twenty to fifty minutes, the mixture is allowed to settle and thereafter subject to a separation step 22 as by a decanting operation or may be separated by centrifugation. The solid rich layer 24 obtained from the separation step 22 is then passed to a standard flash desolventizer, step 26, where the alcohol is removed. In general, where alcohol is called for hereinafter, a flash desolventizer may be employed. After the alcohol is removed, the resultant material is passed into an additional drier, called a re-dry system, step 28, where hot air is passed about the material. The dried material is then ground in a grinder (not shown) to yield an insoluble soy protein 30.

The solid rich layer 44 may be used to form either a soluble soy protein concentrate, containing not less than 70 percent protein, or a soluble soy protein isolate, containing not less than 90 percent protein.

To obtain a soluble soy protein concentrate, the solid rich layer 44 is subjected to an alcohol removal step 48 in which the solid rich layer 44 is passed through a conventional alcohol stripping column. After passing through the stripping column, the material is then subjected to a spray dry step 50 to yield the soluble soy protein concentrate 52. The soy protein concentrate 52 has near 100 percent NSI solubility in water.

If a soluble soy protein isolate is desired, the solid rich layer 44 is mixed, step 54, with an alcohol-water solution similar to step 40. After step 54, the resultant mixture is subjected to a separation step 56 as by centrifugation. The solid rich layer 58 obtained from the separation step 56 is then processed by an alcohol removal step 60 as by passing through a conventional alcohol stripping column or flash desolventizer. After the alcohol removal step 60, the product obtained therefrom is spray dried, step 62, to yield a soluble soy protein isolate 64. The soy protein isolate 64 has over an 80 percent NSI solubility in water. The solid lean layer (not shown) obtained from the separation step 56 may be combined with the solid lean layer 46.

In summary, the solid rich layer 44 obtained from the separation step 42 may be subjected to different processes to yield either a soluble soy protein concentrate or a soluble soy protein isolate.

The solid lean layer 46 obtained from the separation step 42 is passed through an alcohol stripping column to provide the alcohol removal step 66. After the alcohol has been removed by step 66, the material is then spray dried, step 68, to yield a mixture of soy whey solids and sugars 70.

The process described above involves treating defatted soybean material to yield an insoluble soy protein, a semi-soluble soy protein, soy whey solids and sugars, and a soluble soy protein concentrate and/or a soluble soy protein isolate.

An alternate method of forming the soluble soy protein concentrate 52 is to use the spray dry step 50 on the filtrate 18 after the separation step 14 and prior to the alcohol mixing step 40. The separation step 42 and alcohol removal step 48 remove the sugars and the methanol to provide a soluble soy protein concentrate having a protein content of 70 percent and high solubility.

EXAMPLE 1,000 pounds of defatted, dehulled soybean flakes was mixed with 9,000 pounds of water at 185° F. for twenty minutes. The pH was raised to 7.0 by the addition of a buffer such as sodium hydroxide. The mixture was allowed to cool to 130° F. and then sufficient Fermcomolase® was added to provide 1,000 Baker units per 100 gms. of flakes and reaction was allowed to proceed for twenty minutes. Separation of the insoluble material (solids line 16) from filtrate 18 takes place by means of rotary vacuum filter 14.

A 70 percent methanol solution is then added to the insoluble material (step 20) the insolubles line containing 667 pounds solids and 2,612# water. About 7,600 pounds of 70 percent methanol is added. After about twenty minutes, the supernatant (solid-lean) layer is separated from the sludge layer in separation step 22.

The supernatant (solid-lean) layer is then stripped of alcohol (step 34) and dried. The resultant product weighs 112#, contains about 6 percent moisture and 80.50 percent protein of about 52.1 percent N.S.I. solubility.

Alcohol is also removed from the sludge (solid-rich) layer and dried. The resultant product weighs 538# and contains about 3.4 percent moisture and 63.10 percent protein, of 11.46 percent N.S.I. solubility.

Turning to the filtrate 18, it contains about 333# solids and 6,476# water making a total of 6,809# entering a methanol reactor or alcohol mixing step 40. 11,720# of 70 percent methanol is added to the filtrate. Mixing continues for about 20 minutes in step 40 and thereafter separation (step 42) as by centrifuging, takes place into two phases, the solid lean layer 46 and the solid rich layer 44.

The solid rich layer 44 has alcohol removed therefrom by a flask desolventizer (step 48), and is thereafter spray-dried (step 50). The resultant product weights 185.6# contains about 5.2 percent moisture, and 72.50 percent protein (dry basis) having an N.S.I. solubility of about 98.8 percent.

In order to obtain the isolate, the solid rich layer 44 rather than being processed as just set forth, is mixed with 230 percent of 70 percent methanol by weight and separated by centrifugation, into a further solid rich layer 58 and a solid lean stream. The layer 58 is the stripped of alcohol and dried. The resultant product weights 236.4# and contains 5.9 percent moisture, and 90 percent protein (dry basis) of 93.1 percent N.S.I. solubility.

Finally, the solid lean layer 46 separated from step 40, containing about 157# solids, 6,500# water and 12,500# methanol is passed through a methanol stripping column and thereafter the product is spray dried (step 68).

The resultant product 70 weights 166.4# and contains 5.4 percent moisture, 82.6 percent polysaccharides and about 12 percent proteins.

The results are tabulated in the table below:

TABLE

| | Concentrate, 52 | Isolate, 64 | Semi-soluble, 38 | In-soluble, 30 | Whey solids, 70 |
|---|---|---|---|---|---|
| Moisture and volatile matter, percent | 5.2 | 5.6 | 7.6 | 3.4 | 5.4 |
| Crude protein, percent (N=×6.25) | 72.50 | 90.0 | 80.50 | 63.10 | 12 |
| Nitrogen solubility index, percent | 98.8 | 93.1 | 52.1 | 11.46 | |
| Polysaccharides | | | | | 82.6 |

The soluble soy protein concentrates obtained by this novel process are substantially unhydrolyzed, are cream color, and are free flowing. It is a very bland product which has little flavor and odor and possesses high protein, low sugar content, low sodium, high calcium content, excellent nutrition, good water and fat absorption, good extension properties, good thickening ability and good texture control. The soluble soy protein concentrates obtained by this process have a solubility of the order of 92 to 99 percent, whereas the best soy concentrates available on the commercial market have a Nitrogen Solubility Index of the order of about 5 percent.

The high solubility of the soluble soy protein concentrates makes it readily suitable for instant beverages of high nutritional value, non-diary whole milk, non-diary coffee whitener, frozen desserts, aerosol topping, instant breakfasts, dry mix foods, baby and junior foods, dietetic and ethnic foods, emulsifiers, meat industry uses, soy uses, confections, margarine, soy coffee, and the like.

The solubility of the isolates are of the order of 90 to 93 percent and have extremely high solubility values for soy protein products having this high a concentration of protein therein.

The semi-soluble soy protein contained about 80 percent protein and had an NSI solubility of 52 percent.

The insoluble soy protein had a protein concentration of 63 percent and an NSI solubility of about 11 percent.

Similar results are obtained using ethanol, isopropanol and butanol in place and stead of methanol. There are certain processing economies using methanol and the resulting products are, in general, blander tasting, using methanol.

What is claimed is:

1. A process for treating defatted, dehulled soybean material comprising the steps of
- mixing said defatted, dehulled soybean material with water having a pH of between about 6.5 to about 9 and a temperature of between 185° F. and 212° F. for a period of time from about twenty to thirty-five minutes,
- cooling said mixture to a temperature between about 100° F. and 140° F.,
- adding a solution of a peroxidase enzyme to said mixture, when it is at a temperature of between about 100° F. and 140° F., to provide about 100 to 2,000 Baker units for every 100 grams of said soybean material,
- reacting said enzyme with said mixture for a time period of about one to fifty minutes to decompose peroxides in said mixture,
- separating said mixture into a solids portion and a filtrate portion,
- adding at least a 50 percent alcoholic solution to said filtrate portion to form a second mixture, the alcohol in said alcoholic solution being selected from methanol, ethanol, isopropanol and butanol, and
- separating said second mixture into a solid rich layer and a solid lean layer whereby said solid rich layer yields a water soluble soy protein product and solid lean layer yields a semi-water-soluble soy protein product.

2. A process as described in claim 1 including the steps of
- removing the alcohol from said solid rich layer to form an intermediate product, and
- spray drying said intermediate product to form a water soluble soy protein concentrate.

3. A process as described in claim 1 including the steps of
- adding an alcohol-water solution to said solid rich layer to form a third mixture,
- separating a solid rich layer from said third mixture,
- removing the alcohol from said solid rich layer to yield a second intermediate product, and
- spray drying said second intermediate product to form a soy protein isolate material wherein the protein is substantially entirely soluble in water.

4. A process as described in claim 1 including the steps of
- removing the alcohol from said solid lean layer to form a third intermediate product, and
- spray drying said third intermediate product to form soy whey solids and sugars.

5. The process as described in claim 1 whereby said alcohol-water solution contains at least 70 percent by weight alcohol and less than 90 percent, by weight, alcohol.

6. A process for treating defatted, dehulled soybean material comprising the steps of
- mixing said defatted, dehulled soybean material with water having a pH of between about 6.5 to 7.5 and a temperature of between 175° F. and 212° F. for a period of time of from about twenty to thirty-five minutes,
- cooling said mixture to a temperature between about 100° F. and 140° F.,
- adding a solution of the enzyme catalase to said mixture to provide about 100 to 2,000 Baker units for every 100 grams of said soybean material,
- reacting said catalase with said mixture for a time period of about one to fifty minutes to decompose peroxides in said mixture,
- separating said mixture into a solid portion and a filtrate portion,
- adding at least a 50% alcoholic solution to said solids portion to form a second mixture, the alcohol in said alcoholic solution being selected from methanol, ethanol, isopropanol and butanol, and
- separating said second mixture into a solid rich layer and a solid lean layer whereby said solid lean layer is suitable to yield a semi water soluble soy protein product.

7. A process as described in claim 6 including the steps of
- removing the alcohol from said solid lean layer to form a first intermediate product,
- spray drying said first intermediate product to form a semi water soluble soy protein.

8. A process as described in claim 6 including the steps of
- removing the alcohol from said solid rich layer to form a second intermediate product,
- passing said second intermediate product through a redrying step to yield an insoluble soy protein.

9. A process for treating defatted, dehulled soybean material comprising the steps of
- mixing said defatted, dehulled soybean material with an antioxidant and with water having a pH of 6.5 to 7.5 and a temperature of between 175° F. and 212° F. for a period of time from about twenty to thirty-five minutes whereby trypsin inhibitors are destroyed,
- separating said mixture into a solids portion and a filtrate portion,
- adding at least a 50% alcohol solution to said solids portion to form a second mixture, the alcohol in said alcoholic solution being selected from methanol, ethanol, isopropanol and butanol, and separating said second mixture into a solid rich layer and a solid lean layer whereby said solid rich layer is suitable to yield a water soluble soy protein product.

10. A process as described in claim 9 whereby said antioxidant is selected from the group consisting of butylated hydroxy-anisole, butylated hydroxy-tolulene, propyl gallate, and mixtures thereof.

References Cited

UNITED STATES PATENTS 3,340,068 9/1967 Mancuso .............. 99—98

A. LOUIS MONACELL, Primary Examiner

W. A. SIMONS, Assistant Examiner

U.S. Cl. X.R.

99—98; 260—123.5